July 21, 1959     R. O. TIBBETTS     2,895,252
FISHING LURE
Filed April 11, 1958
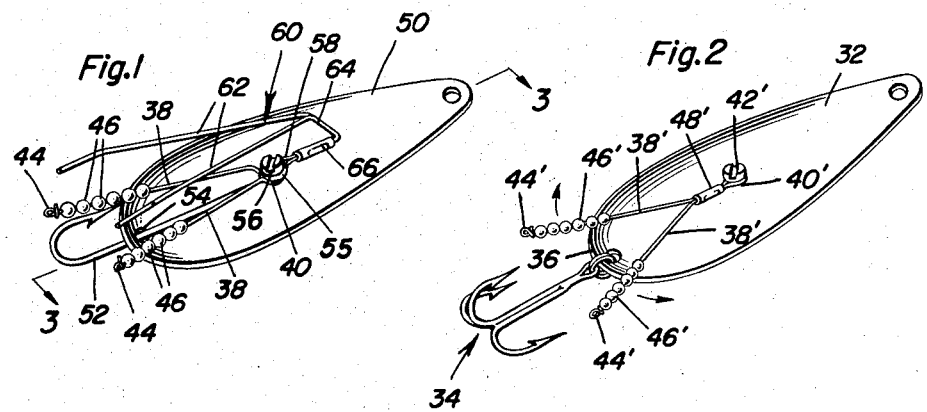
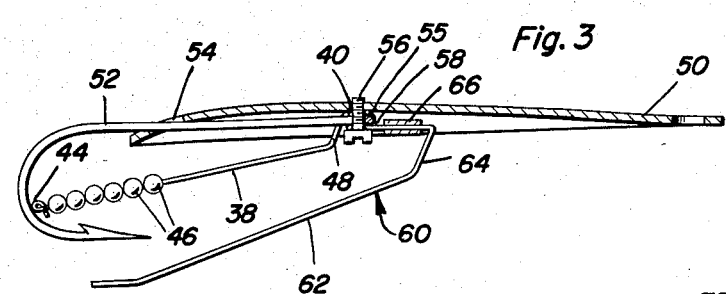
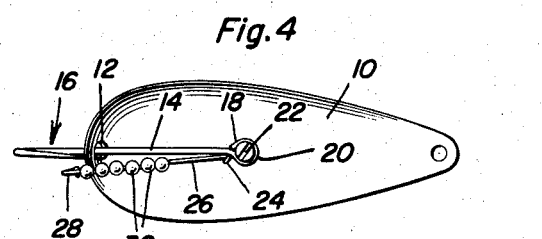
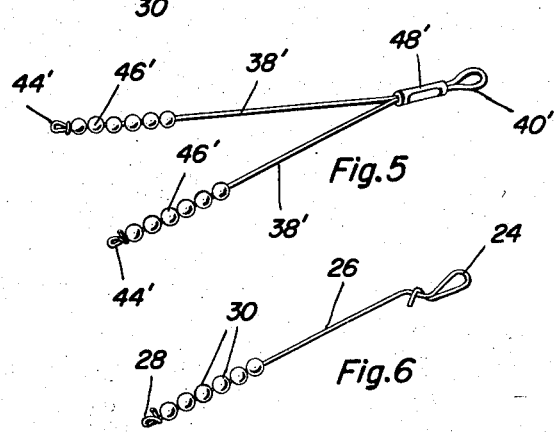
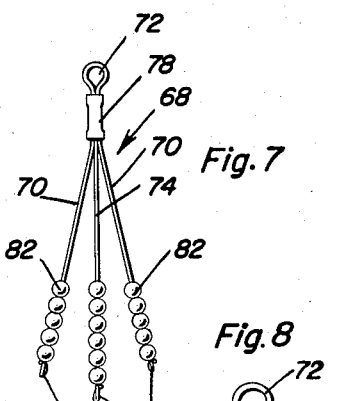
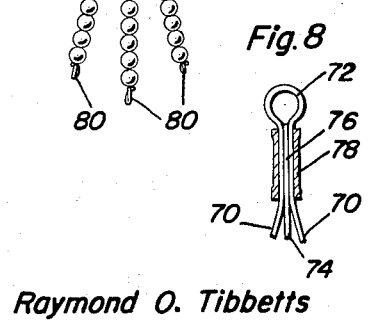
Raymond O. Tibbetts
INVENTOR.

United States Patent Office 2,895,252
Patented July 21, 1959

2,895,252

FISHING LURE

Raymond O. Tibbetts, Menomonie, Wis.

Application April 11, 1958, Serial No. 727,972

3 Claims. (Cl. 43—42.5)

This invention relates to a fishing lure useful for catching fish by casting or spin-casting and which is characterized, broadly speaking, by an elongated spoon which is preferably concavo-convex in form and which is equipped with a fishhook, of one type or another, at the rearward end. Being variable in form and construction the concept has to do with several structural adaptations or embodiments.

One embodiment, a quite simple arrangement, is characterized by the aforementioned spoon, a fishhook, the eye equipped end of which is fastened to a central or median portion of the spoon. Attached to the same fastening is a single limb lure provided with a plurality of slidingly and rotatably mounted beads. The rear end of this limb is disposed adjacent to the fatal barb or point of the fishhook.

Another embodiment of the invention is characterized by a spoon having a triple-type fishhook or double hook linked movably to the trailing end of the spoon. In this arrangement the lure means is characterized by a flexibly resilient V-shaped member constructed from fine-gage vibratory wire, the vertex of which is fastened to the median portion of the spoon, the flexibly resilient limbs being also equipped with loosely mounted spinning lure beads and having their rear ends shouldered and projecting beyond the rear end of the spoon and cooperating with the barbed hooks.

A further embodiment of the invention is characterized by a spoon, a fishhook, a weed guard, and a beaded lure. Cooperating ends of all three, that is the fishhook, weed guard, and beaded lure are joined to a median portion of the convex side of the spoon by way of a single, simple fastening screw.

An advantage of this weedless spoon over several other common types of weedless fishing spoons now on the market is the added attraction of fish to the form, color, and action of the spinning lure beads used. Besides one end of the bead lure is so placed toward the fatal point of the fishhook that the fish are very apt to get caught when they strike at the beads. The weed guard is very effective. I have tested it in weedy lakes and I find it pulls nicely through the weeds without the hook getting hung up. The weed guard is also sturdy and keeps its shape well when in use. This weedless spoon has a good fish appeal action. A common swivel used on the small end of the spoon creates still more effective action.

Another important feature of this invention is the weed guard. There are similar weed guards on other lures, but a distinct difference is that it is held together near the eye by a wire leader sleeve. The wire leader sleeve is not only practical, but makes for easy assembling of the weed guard. I have never seen a weed guard on a fish lure which was held together by a wire leader sleeve. The wire leader sleeve is threaded on the wires, and then crimped securely in place by use of a special crimping pliers. It is an important feature in the resulting sturdy, practical weed guard.

Other objects, features and advantages will become more readily apparent from the following description and the accompanying drawing.

In the drawing:

Fig. 1 is a perspective view of one embodiment of the invention which will be described in detail later on;

Fig. 2 is a perspective view of a second embodiment;

Fig. 3 is a section on the line 3—3 of Fig. 1, looking in the direction of the arrows, and with the spoon inverted;

Fig. 4 is an embodiment similar to that seen in Fig. 2 but of simpler construction;

Fig. 5 is a perspective view of a dual limb beaded lure;

Fig. 6 is a perspective view of a single limb beaded lure;

Fig. 7 is a plan view of a triple limb beaded lure; and

Fig. 8 is a view in section and elevation showing the manner in which the several limbs in Fig. 7 are joined together by a ferrule or sleeve.

Referring now to the drawing and with reference first to the simpler form seen in Fig. 4 the concavo-convex elongated spoon is denoted by the numeral 10. At the larger rear end there is an opening or hole 12 provided for passage of the rigid rear end of the shank 14 of the fishhook 16. The eye 18 of the shank is fastened to the median or central portion 20 of the concave side of the spoon by a simple screw 22 passing through the eye and threaded through a hole in the spoon. This same fastening serves to secure the eye-equipped forward end portion 24 of the beaded lure. This lure is characterized by a flexibly resilient wire or equivalent limb or arm 26 the rear end of which is bent upon itself and fashioned into a pigtail coil 28 providing a retaining shoulder for the freely rotatable and slidable beads 30. As before mentioned the end 28 is preferably located so that it is in close proximity to the fatal part of the fishhook.

In the form of the invention seen in Fig. 2 the spoon is denoted at 32 and the multiple fishhook at 34, this being linked at 36 to the rear end of the spoon. Here the beaded lure is of V-shaped form, is also constructed from a length of fine wire and comprises a pair of duplicate flexibly resilient arms or limbs 38' which are duplicated and have their interconnected end portions formed into an appropriate eye 40' secured by the adjustable fastener or screw 42'. Here again the mode of attachment of the screw and limbs is similar to that seen in Fig. 4. Also the rear ends of the limbs are formed into pigtail coils or eyes 44' which function as stop shoulder means, whereby to hold the freely slidable and rotatable beads 46' in place and against endwise displacement. The side-by-side portions of the limbs adjacent the eye 40' are joined by the ferrule 48'. The rear ends of the limbs project for cooperation with the barbed hooks. Other forms of beaded lures which may be used are disclosed in Figures 6 and 7.

In the form of the invention seen in Figs. 1 and 3, the spoon is like that already described but is here denoted by the numeral 50. The shank of the fishhook 52 passes through a hole provided therefor at 54 with the barbed hook located adjacent the rear end of the spoon. The eye on the forward end as at 55 is secured by the headed screw 56 which passes therethrough and also through a hole provided therefor at the median portion of the convex side of the spoon. Not only does the fastening screw serve to secure the beaded lure in place it also serves to fasten the eye 58 of the weed guard 60 in place. In experimental models a slotted head soft-tapping screw 56 with blunt point and which is nickel-plated is preferably used. (However, a machine screw or rivet may be used.) A hole for the screw is drilled approximately an inch more or less from the perimeter edge of the wide end of the spoon.

The single strand of spinning lure beads requires the use of any good lightweight weed guard wire; size .009 inch weed guard wire is very efficient. On experimental models I used .009 inch Eskilastuna weed guard wire. An eye is formed on one end of the wire, then one or more spinning lure beads of an equal size are strung on the wire; I have found 3 to 7 beads to be most effective in catching fish. The length of the wire depends on the size of the spoon used. After beads are strung on the wire, they are secured by twisting an eye, or a knot, on the end of the wire; this prevents beads from working off wire when a fish is caught. The eye, or knot, is made as small as possible to prevent fish distraction.

The wire is held in place by the screw which holds down the fishhook. The eye of the beaded wire is placed between the eye of the hook and the body of the spoon. The wire strand of beads is then bent upward toward the barb of the hook. The wire strand of beads is made long enough so as to reach and touch, or almost touch, the barb of the hook. Spinning lure beads may be of any color, but in my fish-testing experiments I found red or white to be most alluring, especially when used on a red and white spoon. I find that gold beads go well with copper or brass spoons. Sizes of spinning lure beads used are: 1 mm., 2 mm., 3 mm., 4 mm., 5 mm.

The wire strand of beads sometimes bends a little out of position or shape when a fish is caught on the hook of the spoon, but the wire is easily put back into shape again with the fingers. Beads are free to move back and forth on the wire when the wobbling spoon is in action in water, thus vibrating the wire limbs, causing the beads to "dance" back and forth and giving added fish appeal to the beaded spoon.

The weed guard may be made of any practical size or weight of weed guard wire preferably Swedish spring steel wire or requisite gauge being most practical. For a heavy duty spoon a heavier wire may be used. The weed guard is constructed by bending the length of wire between its ends and upon itself to provide outstanding rearwardly divergent fingers 62 (Figs. 1 and 3). The median portion of the wire is formed into the aforementioned anchoring or attaching eye 58. The adjacent portions are bent somewhat at right angles to each other with the bent portions 64 close together and the adjacent bent portions surrounded by a sleeve 66 which is clenched or otherwise crimped to retain its given position.

The weed guard is shaped as in Fig. 1 and is made long enough to extend at least ¼ inch beyond the sharp end of the hook. To protect the hook from snagging weeds, the wires are set at least ¼ inch above the hook; these wires may, however, be easily adjusted to suit the desires of the fisherman using the spoon.

The weed guard is sturdy and practical. It does a nice job of shedding weeds and other plants like those found in our game fish lakes. The weed guard affords protection in preventing the hook from "hanging up" on obstacles. By using the spoon, fishhook, and weed guard, a good plain weedless fishing spoon is created.

With reference to Figs. 5 and 6 these perspective views are of the beaded lures already described in the assembly views and therefore, as pointed out, the same reference numerals are applied to corresponding or like parts. In connection with these lures no specific number of beads must necessarily be strung or mounted on each strand of wire. Nor do the beads on any strand have to be all the same size. It is within the purview of the invention to employ a tapering effect which is obtained by using beads which are graduated properly in sizes. Experience has shown that anywhere from three to six beads mounted on strands of wire of the approximate sizes illustrated are ample and practical for efficient use.

The spoon itself has a lot of fish appeal with its wobbling, turning action as it is being retrieved through the water after casting.

Any of the bead lures depicted in Figs. 5, 6, or 7, when used on the device illustrated in Fig. 2, may be set to remain stationary by turning the screw down tight. (When using the bead lure of Figure 5 to construct an immovable lure of the device shown in Figure 2, the screw is screwed down tight, therefore the wire leader sleeve 48' may be omitted. This decreases the weight of the lure, thereby improving the action of the fishing spoon.) When any of the bead lures is made immovable, the wires of the beaded lure are set to protrude out toward the end of the spoon where the fishhook is attached. The wires may be of any desired length, but it is most practical to have them reach out to within ¼ or ½ inch of the sharp ends of the fishhook; thus the hook is allowed to swing freely from side-to-side without interference from the wire bead lure. Although the bead lure is set stationary, the beads are free to move along the vibratory wire limbs.

In constructing the fish spoon device illustrated in Fig. 2, each of the beaded lures depicted in Figs. 5, 6, and 7 may be made to be movable. This is accomplished by not screwing the screw down tight. A gap is left between the head of the screw and the body of the spoon—enough gap, or space, is left to allow the bead lure to swing freely from side-to-side at the wide end of the spoon. The swinging of the bead lure results in increased fish attraction because of the added action created. When leaving the bead lure to swing freely, the bead lure does not have to be of any particular length; however, it should be long enough to extend some practical distance beyond the wide end of the spoon because then it will be more visible and more attractive to fish. The beaded lure should not be too long to interfere with the action of the fishhook.

With reference now to Figs. 7 and 8 the beaded lure is of a triple-limb construction and is denoted generally by the numeral 68. Two of the limbs 70 are joined together at 72 much in the manner illustrated in Fig. 5. The third and central limb 74 is interposed between the two limbs 70 and has an end portion sandwiched in place between the cooperating portions of the limbs 70 as detailed in Fig. 8 and denoted at 76. These cooperating portions of the respective limbs are secured together by a sleeve or ferrule 78 which is clenched or crimped by a pair of pliers to perform the function illustrated. The other ends of the limbs are provided with retaining eyes or shoulders 80 for the beads 82.

Since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A fishing device comprising, in combination, a spoon, a multiple sprong fishhook, connecting means linking the shank of the fishhook to the rear central portion of said spoon, a substantially V-shaped lure embodying a pair of companion rearwardly diverging flexibly resilient vibrating limbs having their forward ends connected together and also removably and adjustably connected by a headed fastener to a median portion of said spoon in general alignment with the fishhook, the rear ends of said limbs being free and projecting in a plane above the spoon and beyond the rear end of the spoon and having stop shoulder means and said limbs being provided with a plurality of freely rotatable and slidable beads.

2. A fishing device comprising, in combination, an elongated concavo-convex spoon having a rear end provided with a first hole centrally positioned, having a median portion provided with a second hole centrally positioned in alignment with said first hole and a forward portion having a third hole for line attachment means aligned with said first and second holes, a fishhook having a barbed end located beyond the rear end of said spoon, said fishhook having a shank passing forwardly through said first hole and terminating in an eye in alignment with said second hole, a vibratory lure V-shaped in plan and embodying a pair of companion rearwardly diverging flexibly resilient fine-gage limbs which may vibrate freely in response to wobbling movements of the spoon during the act of fishing, the median bight portion of said lure being provided with an eye in alignment with said second hole, the rear vibratory free end portions of said limbs extending in a plane above and clear of the concave side of said spoon and projecting beyond said rear end and terminating in stop shoulders, said rear ends being disposed on opposite sides of the barbed hook and being disposed in a plane between the spoon and the barbed end of said fishhook, and a plurality of freely rotatable and slidable beads mounted on the respective limbs and held against endwise displacement by way of stop shoulders which are provided on the rear ends of said limbs, and a headed fastener having a shank portion passing through the aligned eyes and through said second hole and secured in place by way of said second hole.

3. The structure defined in claim 2 and in combination with said structure, and a relatively rigid weed guard having rearwardly inclined fingers located on the same side of the spoon as the hook, having a forward end portion substantially L-shaped in side elevation and including a return bend terminating in an eye aligned with the aforementioned eyes, said headed fastener passing through all of said eyes and thus serving to cooperatively assemble and retain the fishhook, beaded lure and weed guard on the spoon, the vibratory limbs of said beaded lure being located between the fingers on said weed guard and spoon.

References Cited in the file of this patent

UNITED STATES PATENTS

| | | |
|---|---|---|
| 2,195,347 | Wiard | Mar. 26, 1940 |
| 2,492,064 | Rauh | Dec. 20, 1949 |
| 2,551,221 | Pray | May 1, 1951 |
| 2,576,795 | Lane | Nov. 27, 1951 |
| 2,603,025 | Brown | July 15, 1952 |